United States Patent [19]

Iwasaki

[11] Patent Number: 4,851,901
[45] Date of Patent: Jul. 25, 1989

[54] STEREOSCOPIC TELEVISION APPARATUS
[75] Inventor: Kenji Iwasaki, Yokohama, Japan
[73] Assignee: Kabushiki Kaisha Toshiba, Kawasaki, Japan
[21] Appl. No.: 90,521
[22] Filed: Aug. 28, 1987
[30] Foreign Application Priority Data Sep. 3, 1986 [JP] Japan .............................. 61-205911
Jun. 29, 1987 [JP] Japan .............................. 62-159664

[51] Int. Cl.⁴ ..................... H04N 13/00; H04N 5/32
[52] U.S. Cl. ........................................ 358/88; 358/1; 358/111
[58] Field of Search ................... 358/88, 1, 92, 111; 250/306

[56] References Cited

U.S. PATENT DOCUMENTS

| 4,039,829 | 8/1977 | Kato et al. | 358/92 |
| 4,214,267 | 7/1980 | Roese et al. | 358/88 |
| 4,558,359 | 12/1985 | Kuperman et al. | 358/89 |
| 4,654,872 | 3/1987 | Hisano et al. | 358/88 |
| 4,684,990 | 8/1987 | Oxley | 358/88 |

Primary Examiner—James J. Groody
Assistant Examiner—John K. Peng
Attorney, Agent, or Firm—Finnegan, Henderson, Farabow, Garrett & Dunner

[57] ABSTRACT

A stereoscopic television apparatus comprises two image sensors which alternately output image signals respectively corresponding to those of the right and left eyes, a monitor alternately displaying the image signals of the two image sensors as first and second field images, and a shutter member having right and left shutters alternately switched in synchronism with the alternating displays of the first and second field images, to create a stereoscopic image. A marker generator inputs brightness signals corresponding to markers into the monitor, to provide the markers at two arbitrary poionts in the stereoscopic image. A distance calculator calculates the distance between the markers, based on the coordinates X, Y, Z obtained by processing the marker signals.

7 Claims, 6 Drawing Sheets

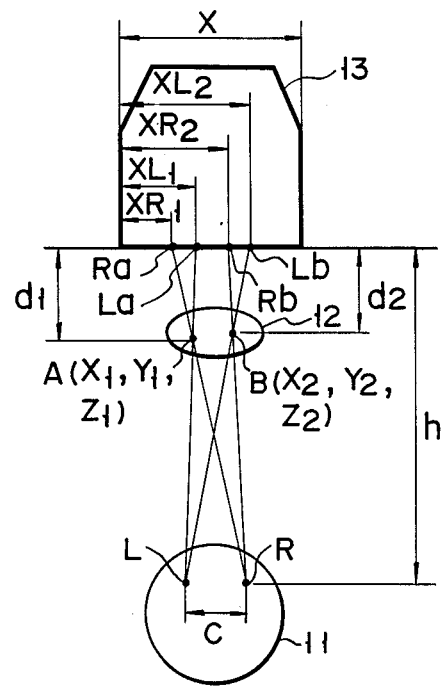
FIG. 2
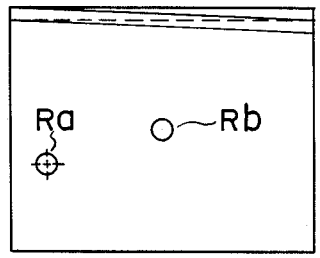 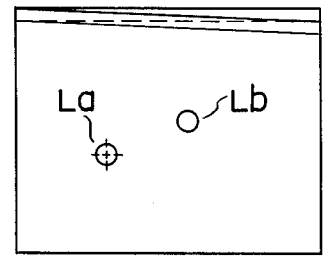
FIG. 3A    FIG. 3B

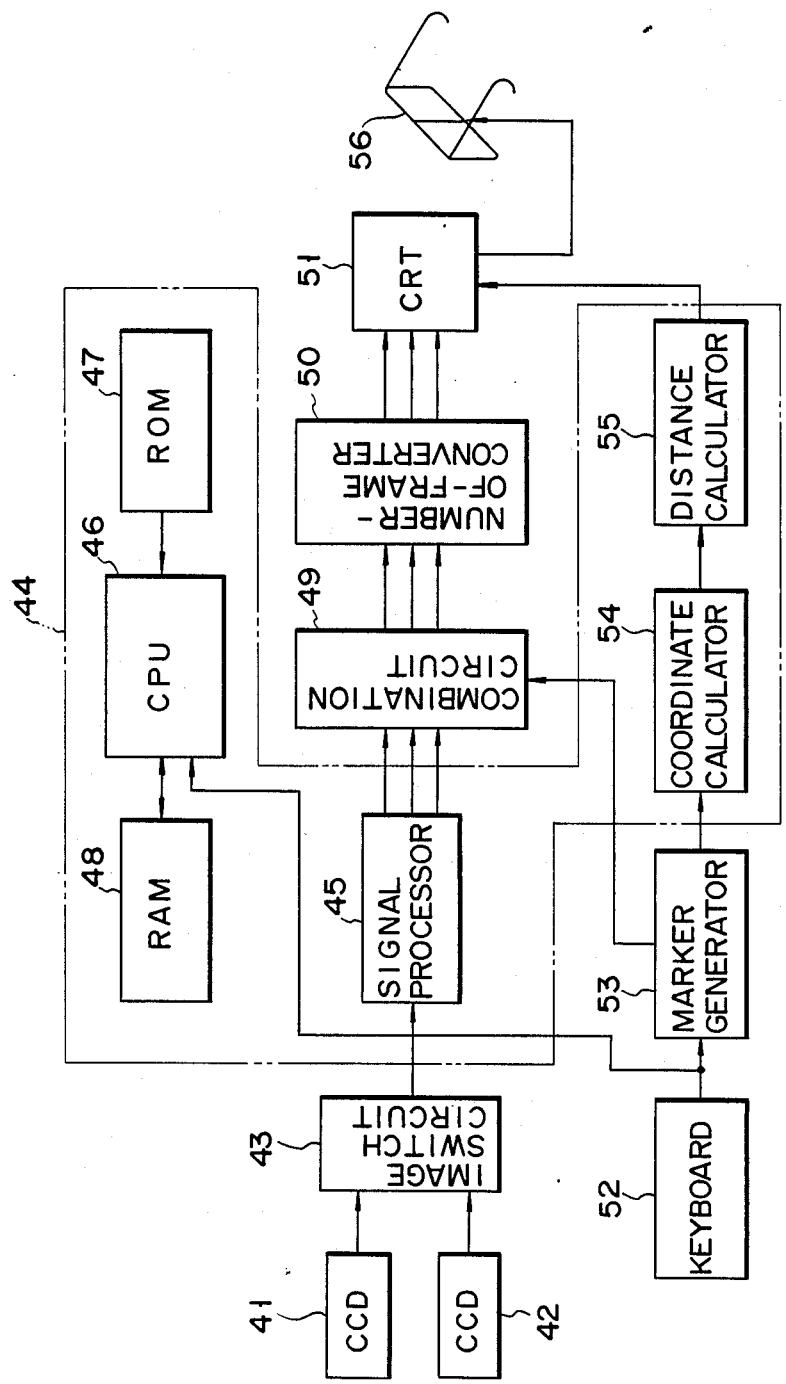
F I G. 5

STEREOSCOPIC TELEVISION APPARATUS

BACKGROUND OF THE INVENTION

This invention relates to a stereoscopic television apparatus that displays stereoscopic images.

Stereoscopic televisions of which projected images on the screen are viewed in three dimensions when looked at through special eye-glasses, have been in use for displaying images for medical practice as well as for common television receivers.

According to the stereoscopic television, the image seen by the right eye and the image seen by the left eye are displayed alternately for each one field on the monitor such that the images on the monitor viewed through alternating switchings of right and left eye-shutters being synchronized to the alternating display timing of the right and left images may be perceived in three dimensions.

In a medical diagnosis application, there sometimes arises a need to measure a distance between two arbitrary points in a certain stereoscopic image, for example, a distance from a certain position to the center of a diseased portion. However, in conventional stereoscopic televisions, the stereoscopic image on the monitor screen is perceived in three dimensions because of the difference of views between the right and left eyes, such that two points cannot be specifically located in the screen image by means of a cursor, thus prohibiting the measurement between the two points.

SUMMARY OF THE INVENTION

It is an object of the present invention to provide a stereoscopic television apparatus capable of quantitatively recognizing at least one position in a stereoscopic image, which position is designated by an operator.

It is another object of this invention to provide a stereoscopic television apparatus that can specifically locate two arbitrary points in a screen image perceived in three dimensions to measure the distance between the two points.

According to the invention, the stereoscopic television apparatus comprises an image signal output circuit that alternately outputs first and second image signals respectively corresponding to those of the right and left eyes, a monitor alternately displaying the first and second images corresponding to the first and second image signals, right and left shutters alternately switching on and off in synchronism with the alternating displays of the 1st and 2nd images to accomplish the effect of perceiving the 1st and 2nd images as a stereoscopic image, and a marker generator that inputs brightness signals corresponding to markers into the monitor to provide them at two arbitrary points in the stereoscopic image.

BRIEF DESCRIPTION OF THE DRAWINGS

FIG. 2 shows a related arrangement of positions for a subject body and image intensifiers;

FIGS. 3A and 3B respectively show a left field and a right field;

FIG. 5 shows another block diagram of circuits in another embodiment of the invention for common television images;

DETAILED DESCRIPTION OF THE PREFERRED EMBODIMENTS

Figure 1:
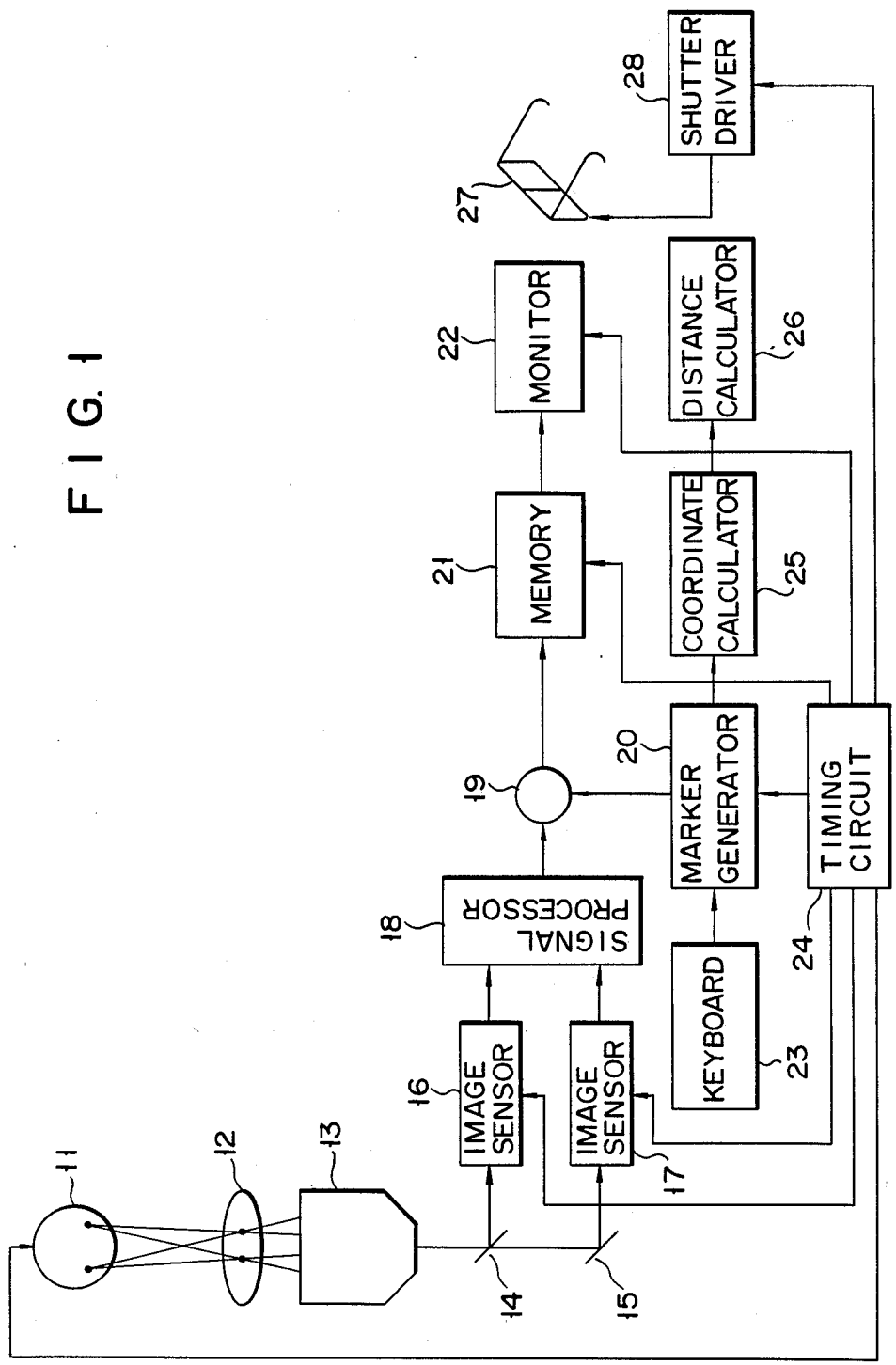
FIG. 1 shows a block diagram of circuits in a stereoscopic television apparatus embodying the invention for use in X-ray photography.

According to a stereoscopic television apparatus for X-ray image display in FIG. 1, X-ray tube 11 of a two-focus type is arranged to radiate X-rays through a subject (or an object) 12 to an image intensifier 13, which transforms the X-rays transmitted through the object 12 into light in order to output an X-ray image. The display plane for X-ray images from the image intensifier 13 is arranged to be provided on the optical axes of half mirrors 14 and 15 arranged in sequence, so that half mirrors 14, 15 reflect the X-ray image from the intensifier 13 onto image sensors 16 and 17, from which image signal output terminals are connected through signal processor 18 to an input terminal of combination circuit 19 whose other input terminal is connected to the output terminal of marker generator 20, provided to output marker signals, which will be described later. The output terminal of combination circuit 19 is connected through memory 21 to monitor 22.

The input terminal of marker generator 20 is connected to keyboard 23, while the timing signal terminal of generator 20 is connected to the output terminal of timing generator 24. Marker generator 20 responds to the instruction from keyboard 23 to output luminance signals corresponding to marker signals, that is, markers being displayed on the monitor 22. Positions of the markers displayed on the monitor 22 are designated by keyboard 23. When the coordinates designated by keyboard 23 conform to the timing signals being output from timing generator 24 in correspondence to the scanning lines of monitor 22, marker generator 20 outputs luminance signals.

Marker generator 20 is also connected to coordinate calculator 25, which calculates coordinates of markers in accordance to the marker signals from generator 20. The output terminal of coordinate calculator 25 is connected to distance calculator 26, which calculates a distance between two points based on the coordinate information from coordinate calculator 25.

An eye shutter member 27, which consists of a liquid crystal member, is provided to alternately switch the shutter operation for the left or right eye so as to create a stereoscopic view of the image shown on monitor 22. Liquid crystal shutter member 27 is controlled by shutter driver 28, which is controlled by timing signals generated by timing circuit 24 in synchronism with the switching timings of image sensors 16 and 17 to drive shutter member 27.

In the apparatus of the foregoing composition, X-ray tube 11 irradiates X-rays on object 12 alternately from two focal points ($X_L$ and $X_R$) arranged in a distance corresponding to the distance (Approx. 52 mm) between the centers of both eyes. X-rays are projected through the object body having parts A and B onto intensifier 13. Then, picture elements $R_a$, $L_a$ and $R_b$, $L_b$ respectively corresponding to parts A and B are formed on the plane of the X-ray projection on the image intensifier 13. The elements $R_a$ and $L_a$ correspond to the image of part A respectively viewed by the right and left eyes, and elements $R_b$ and $L_b$ correspond to the image of part B viewed by the respective eyes.

X-rays projected onto image intensifier 13 are transformed into X-ray images, which are then picked up as images by image sensors 16 and 17. The right and left images which are alternatively displayed on intensifier 13 are picked up by the respective image sensors 16 an 17 being driven alternately by timing signals from timing circuit 24 to be output as image signals, the right image for the first field (FIG. 3A) and the left image for the second field (FIG. 3B).

Image signals from sensors 16 and 17 are processed by signal processor 18 and input through the combination circuit 19 to memory 21, which stores the image signals corresponding to the right and left eyes. The image signals for the right and the left are alternately read out to be input to monitor 22, which alternately displays the right image and the left one for the respective first and second field images (FIG. 3A and 3B) which will, when viewed through the shuttering member 27 of which right and left shutters switchingly operate in synchronism with the alternate display of the first and second field images, be perceived as stereoscopic images on monitor 22.

Figure 4:
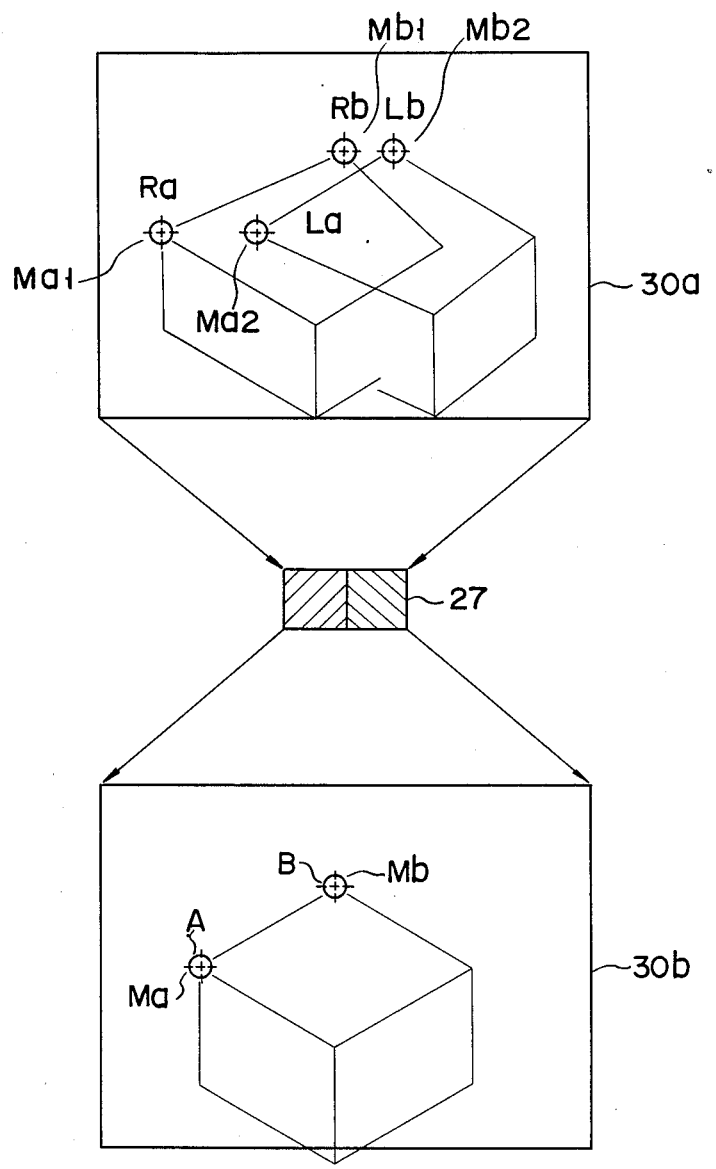
FIG. 4 shows an image being visually perceived without the use of shutter but having markers corresponding to two points, and an image being stereoscopically perceived with the use of shutters and having markers.

In FIG. 4, image 30a shows a display image on monitor 22 viewed without the use of the shutter member 27 and indicates double images of the subject in view in relation to right and left eye views, while image 30b shows the stereoscopic image of the image 30a perceived when viewed through the shutter member 27.

Now, description shall be made of the provision of markers Ma and Mb on the stereoscopic image 30b.

The setting of the marking mode by the keyboard 23 causes a CPU (not shown in drawings) to display marking menu information on the monitor 22. A starting point is then set up by operating keyboard 23 according to the menu. The setting up of the starting point at the coordinates corresponding to the part A causes marker generator 20 to output marker signals (two marker signals respectively corresponding to the right or left eye) corresponding to the coordinate information from keyboard 23. The marker signals combine with image signals in combination circuit 19 to be input through memory to monitor 22, which displays marker Ma being moved by key-pressing of keyboard 23 and superimposed on part A (FIG. 4). When viewed without the shutter member 27, marker Ma will be displayed as two markers Ma1 and Ma2, as shown in the image 30a.

Marker Ma is fixed by pressing a predetermined key of keyboard 23. Next, when a predetermined key of keyboard 23 is pressed, marker Mb is displayed on a position adjacent to marker Ma in stereoscopic image 30b. Marker Mb may be moved to any desired position by manipulation of a cursor on the keyboard so as to cause it to meet with the desired part B. If marker Ma coincides with part A, markers Ma1 and Ma2 coincide with picture elements Ra and La, respectively. If marker Mb coincides with part B, markers Mb1 and Mb2 coincide with picture elements Rb and Lb, respectively.

Upon setting markers Ma and Mb on the stereoscopic image and then setting a measuring mode, the measuring of the distance between markers Ma and Mb, that is between parts A and B, is performed. In the course of measuring the distance, marker signals being output from marker generator 20 and corresponding to markers Ma and Mb are input into coordinate calculator 25. In such a case, four marker signals corresponding in pairs to first and second fields for two markers Ma and Mb are output. Then, coordinate calculator 25 calculates based on the four marker signals the coordinates of markers Ma and Mb in the three-dimensional space in the stereoscopic image, as shown in FIG. 4.

The coordinate calculation is carried out in an operation using the generating position information (information corresponding to scanning positions of the monitor) of the marker signals (Ma1, Ma2, Mb1, Mb2) of image 30a and from the known geometrical parameters memorized in ROM (not shown).

That is, from the parameters shown in FIG. 2, the coordinates of the parts A and B are calculated according to the following formula:

$$X_1 = [c/2(XL_1 - XR_1) + l/2(XL_1 - XR_1)]/(c + XL_1 - XR_1),$$

$$Y_1 = [Yc + k/2(XL_1 - XR_1)]/(c + XL_1 - XR_1),$$

$$Z_1 = d = h(XL_1 - XR_1)/(c + XL_1 - XR_1),$$

$$X_2 = [c/2(XL_2 + XR_2) + l/2(XL_2 - XR_2)]/(c + XL_2 - XR_2),$$

$$Y_2 = [Yc + k/2(XL_2 - XR_2)]/(c + XL_2 - XR_2),$$

$$Z_2 = d = h(XL_2 - XR_2)/(c + XL_2 - XR_2)$$

where c=the distance between X-ray irradiation sources, h=the distance from the X-ray irradiation means to the image intensifier means, d=the distance from the subject to the image intensifier means, XR=the distance from an end of the intensifier means to the position of X-ray projection of the subject part corresponding to the marker from the first X-ray source, XL=the distance from the said end of the intensifier means to the position of X-ray projection of the subject part corresponding to the marker from the second X-ray source, l=the width of the intensifier, Y=the depth of the intensifier.

Upon calculating the coordinates of A and B by the fore going formulas, the result, that is, the information of the coordinates $(X_1, Y_1, Z_1)$ and $(X_2, Y_2, Z_2)$ is input from coordinate calculator 25 to distance calculator 26, which calculates the distance Xl between A and B based on the coordinates $(X_1, Y_1, Z_1)$ and $(X_2, Y_2, Z_2)$ by the following formula, $$Xl = \sqrt{(X_1-X_2)^2+(Y_1-Y_2)^2+(Z_1-Z_2)^2}.$$

Distance Xl obtained by calculator 26 is input to monitor 22 to be displayed as a numerical value.

As described in the foregoing, the synchronous switchings of two focal points of X-ray tube 11, of image sensors 16 and 17 and of right and left shutters of shutter member 27 create the perception of a stereoscopic image for the subject in display on monitor 22 which is viewed through shutter member 27. To have at least two markers in the stereoscopic image, marker signals are combined with image signals of the right and left image sensors. The markers may be moved to any position of the stereoscopic image by changing output timing of marker signal of marker generator 20 in relation to the scanning lines, that is, horizontal scanning lines. The designation of two positions by two markers makes it possible to measure the distance between the two positions in a stereoscopic view.

Although the foregoing embodiment employs an X-ray tube of a two focus type, two X-ray tubes may also be employed. Also, instead of employing two image sensors, one image sensor may be employed to pick up right and left X-ray images. However, the alternate use of two image sensors has an effect of reducing the number of image pick-ups per unit hour to ½ for each image sensor with an advantage of reducing the influence of residual images on the photoconductive film of sensors.

Besides the foregoing embodiment of a stereoscopic television apparatus based on the right and left X-ray images obtained by alternate switching of X-ray irradiation between right and left irradiation sources, the invention may be applied to a common stereoscopic television apparatus. A preferred embodiment of such an application shall be described as follows.

In FIG. 5, two image pick-up cameras (CCD cameras) 41 and 42 are arranged with a distance c (equal to the distance—52 mm—between both the centers of the eyes). The output terminals of cameras 41 and 42 are connected to image switch circuit 43 which alternately switches the image signals from cameras 41 and 42 for each one field. The output terminal of switch circuit 43 is connected to signal processor 45 in control circuit section 44, which includes CPU 46 for system control, ROM 47 housing a system program, RAM 48 functioning as a memory for temporary storing of data or as a working memory, and others.

Signal processor 45 processes image signals being input through switch circuit 43 and functions to separate them into R, G and B signals, and its output terminal is connected through combination circuit 49 to number-of-frame converter 50, which functions to convert the image signals being usually 30 frames/seconds into signals of 60 frames/second and connects with its output terminal to CRT monitor 51.

Keyboard 52, which is an operational panel, connects to CPU 46 and to marker generator 53, whose output terminals connects to a combination circuit and to coordinate calculator 54 being provided in control circuit section 44. The output terminal of coordinate calculator 54 is connected to distance calculator 55.

In the circuit in FIG. 5, image signals being output from CCD cameras 41 and 42 are alternately input into signal processor 45 for each one field through image switching circuit 43. Signal processor 45 processes the image signals being input and separates into R, G and B signals, which are input to combination circuit 49 to be combined with the marker signals from marker generator 53.

Since marker generator 53 outputs marker signals corresponding to markers Ma and Mb as shown in FIG. 4, combination circuit 49 outputs video signals including brightness signals corresponding to markers Ma and Mb. Number-of-frame converter 50 converts the video signals of 60 fields/second being input from the combination circuit 49 into video signals of 120 fields/second to input to CRT monitor 51, which displays the image having markers. When viewed through shutter member 56, the image will be perceived as a stereoscopic image with markers as in FIG. 4. One of the markers is fixed at a predetermined position of the subject, while the other marker is arranged to move to any desired position by manipulation of a cursor by operating the keyboard 52.

Upon fixing the two markers at desired positions of the stereoscopic image and setting a measuring mode, the measuring operation is carried out for the distance between positions A and B designated by the respective markers.

Figure 6:
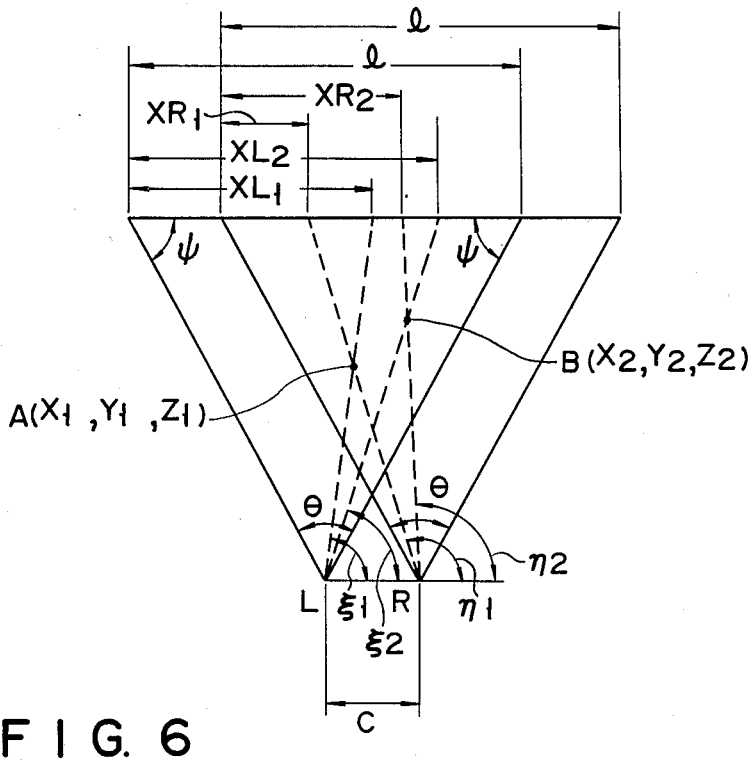
FIG. 6 shows optical trackings of images for explaining the stereoscopic display process in the embodiment in FIG. 5.

As shown in FIG. 6, two cameras 41 and 42 respectively designated as L and R are positioned with distance c between them. The cameras L and R are respectively able to pick up images with viewing angle $\theta$. The images of objects A and B are picked up in the directions of angles $n1$, $n2$, $\xi1$, $\xi2$, in relation to cameras L and R. Assuming the whole length of the horizontal axis of the frame as $l$, and the distances from the left end to subjects A and B as $XL_1 XR_1$, $XL_2$ and $XR_2$, the following formulas are established:

$$\phi = (\pi - \theta)/2$$

$$\tan\xi 1 = l/2\tan\phi/(XL_1 - l/2)$$

$$\tan\eta 1 = l/2\tan\phi/(XR_1 - l/2)$$

$$\tan\xi 2 = l/2\tan\phi/(XL_2 - l/2)$$

$$\tan\eta 2 = l/2\tan\phi/(XR_2 - l/2)$$

Assuming the center between the cameras L and R as the origin, the coordinates $(X_1, Y_1, Z_1)$ and $(X_2, Y_2, Z_2)$ of the objects A and B are represented by the following formulas:

$$X_1 = c(XL_1 + XR_1 - l)/2(XL_1 - l/2)$$

$$Y_1 = cl(k - 2y)\tan\phi \cdot \tan\theta/2/2k(XL_1 - XR_1)$$

$$Z_1 = cl\tan\phi/2(XL_1 - XR_1)$$

$$X_2 = c(XL_2 + XR_2 - l)/2(XL_2 - l/2)$$

$$Y_2 = cl(k - 2y)\tan\phi \cdot \tan\theta/2/2k(XL_2 - XR_2)$$

$$Z_2 = cl\tan\phi/2(XL_2 - XR_2)$$

where
K=frame length in the direction of Y axis,
Y=distance from the upper end of the frame to the lower end.

Upon inputting the coordinates $(X_1, Y_1, Z_1)$ and $(X_2, Y_2, X_2)$, obtained by the foregoing formulas, to distance calculator 55, distance D between subjects A and B is obtained by the following formula:

$$D = \sqrt{(X_1 - X_2)^2 + (Y_1 - Y_2)^2 + (Z_1 - Z_2)^2}$$

Upon inputting distance D, obtained by the distance calculator 55, into CRT monitor 51, distance D is displayed in n numerical value.

In employing the stereoscopic television apparatus of FIG. 5 for an endoscope, it can obtain a distance between two positions in a body cavity; for sports photography, it obtains the distance between two golf balls or a distance between marathon race runners, for example.

In the foregoing embodiment shown in FIG. 4, in relation to markers Ma1, Mb2 corresponding to the marker Ma, and markers Mb1, Mb2 corresponding to Mb, a large distance between two markers causes the observer to perceive the image in stereoscopic view as that of the marker nearer to him, whereas a small distance between them causes the observer to perceiver the marker in stereoscopic image as being at the position farther away from the observer. That is, in FIG. 4 markers Ma1Ma2 in a stereoscopic image are perceived as marker Ma being nearer to the observer, while markers Mb1Mb2 are perceived in a stereoscopic image as marker Mb being further away from him. Markers Ma1 and Mb1 are for the first fields, markers Ma2 and Mb2 are for the second field, and both the marker groups are alternately displayed as previously described.

However, if markers Ma and Mb having far and near views, as in the above, were to be displayed with the same sizes with respect to each other, the displayed markers will not easily be perceived in a perspective view and provide an unnatural view. Therefore, to express the perspective, there is provided a function that displays the nearer marker to be larger and the farther marker to be smaller.

Figure 7:
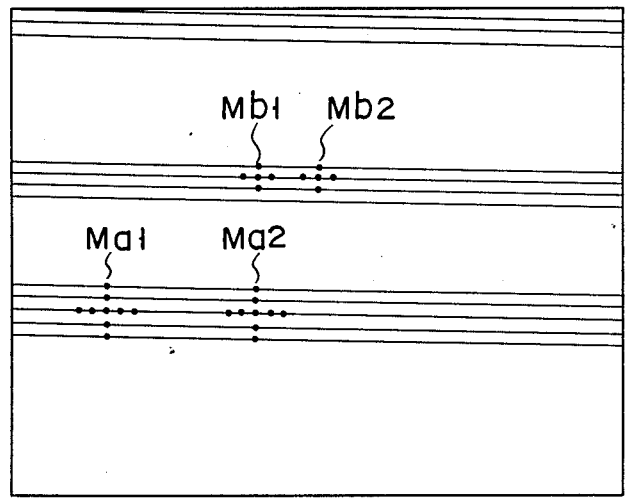
FIG. 7 shows a screen having perspective markers to be two-dimensionally perceived.
Figure 8:
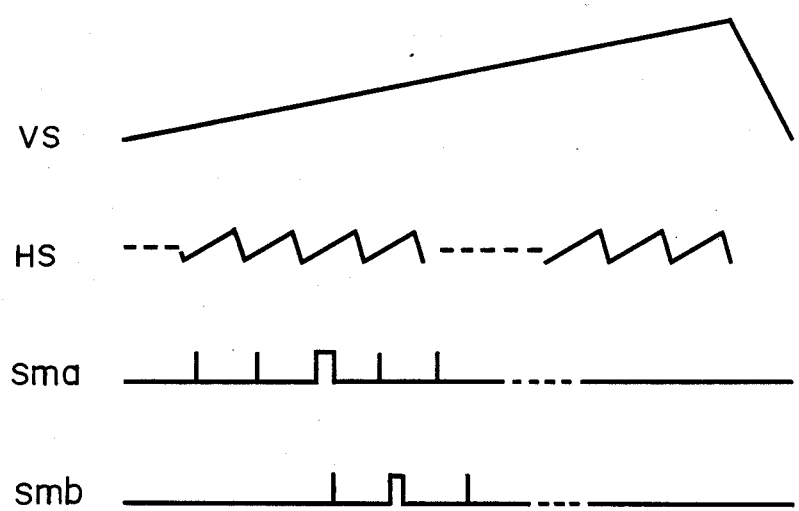
FIG. 8 shows timing charts of marker signals corresponding to the markers in FIG. 7, and scanning signals.

FIG. 7 shows markers Ma1, Ma2 and Mb1Mb2 displayed in a perspective sense of view. In the Figure, markers Ma1 and Ma2 for nearer positions are represented in a larger format while markers Mb1 and Mb2 for farther positions are represented in a smaller format. To display markers Ma1, Ma2 and Mb1, Mb2, marker signals Sma and Smb shown in FIG. 8 are generated in relation to horizontal signal HS and vertical signal VS. That is, signal (luminance signal) Sma corresponding to the markers Ma1, Ma2 has a larger number of pulses than signal (luminance signal) Smb corresponding to markers Mb1, Mb2 for farther positions and its center pulse is also larger in pulse width than the other's. The respective sizes of markers Ma1, Ma2 and Mb1, Mb2 are determined with regard to the distance between the paired markers. The shape of the markers is not limited to a cross mark, but may be in the form of a circular mark or an arrow mark. Also, the display of the marker may not be limited to its degree of brightness, but may be made in black or any other color. Further, in setting markers Ma and Mb at arbitrary positions in an image, the foregoing embodiments employ a method of positioning one marker first and then another next, but a method may be employed with positions both markers while moving them together. However, the method of positioning one marker first to make it the starting point better facilitates the ability to find the position of the other marker in relation to the starting point, hence, finding the distance between the two markers.

According to the invention of the foregoing, the method of designating by means of markers two positions in a stereoscopic image while observing it makes it possible to measure the distance between the two positions in the stereoscopic image, and in particular, makes it possible to measure the distance, for example, from a certain position to the affected part and the size of the affected part, in an object displayed in stereoscopic images for medical use, so as to enable to confirm the accurate seat of disease for surgical operation.

Although the foregoing embodiments employ the stereoscopic television of the time-division type that displays the right and left images, displayed in time-division, through shutters being alternately switched between right and left to create a stereoscopic image, the invention may also be applied to other types of stereoscopic televisions, for example, to a lenticular system that displays the stereoscopic image by means of providing an optical member formed of an arrangement of a plurality of cylindrical lenses or to a type of stereoscopic television that displays right and left images in different colors which are observed through a color filter and perceived as a stereoscopic image. These types do not always employ a field sequential method for alternatively switching fields, but use a method for simultaneously displaying two fields on a single CRT or screen. In this case, markers are appended to right and left images, respectively, and positioned on the target portions of the subject. The coordinates of the markers are determined, based on the positions of the scanning lines, on which the markers are placed.

The above embodiments designate two points within the stereoscopic image displayed on a monitor and calculate a distance between two points. However, one point may be designated within the stereoscopic image, and the coordinate corresponding to the designated point may be calculated to quantitively recognize the position corresponding to the designated point.

In an X-ray imaging system, a distance from the body surface of a patient to the surface of an image intensifier is substantially determined. Thus, one point is determined within the stereoscopic image, the coordinate corresponding to the point can be calculated in association with the image intensifier-to-patient distance. That is, if only one point is designated within the stereoscopic image, the position corresponding to the designated point can be recognized.

In a conventional stereoscopic television system, if a reference position is predetermined, when only one position is designated within the stereoscopic image by a marker, the designated position can be calculated in association with the reference position.

What is claimed is:

1. A stereoscopic television apparatus, comprising:
image signal output means for generating image signals corresponding to views of right and left eyes, in which said image signal output means comprises X-ray generating means which irradiates X-ray onto a subject and has first and second X-ray sources arranged in a distance between them, image intensifier means which outputs as an X-ray image the X-ray received through said subject from said X-ray generating means, and image pickup means which picks up X-ray images and outputs image signals;
display means which displays as images said image signals being output from said image signal output means and corresponding to the respective views of the right and left eyes;
optical means employed to create as a stereoscopic image said image displayed by said display means;
marker signal output means connected to the output of said image signal output means and generating marker signals for combining with said image signals to form at least two markers in the stereoscopic image being displayed by said display means and observed through said optical means;
coordinate calculation means connected to said marker signal output means and calculating coordinates of markers from said marker signals, wherein said coordinate calculation means includes means which calculates the coordinates (X, Y, Z) of said markers by the following formulas, $$X = [c/2(XL + XR) + l2(XL - XR)]/(c + XL - XR)$$

$$Y = [yc + k/2(XL - XR)]/(c + XL - XR)$$

$$Z = d = h(XL - XR)/(c + XL - XR)$$

where c=the distance between X-ray sources, h=the distance from said X-ray sources to said image intensifier means, d=the distance from said subject to said image intensifier means, XR=the distance from an end of said intensifier means to an X-ray image projection point of an object part corresponding to said marker and being irradiated by X-ray of said first X-ray source, XL=the distance from said end of said image intensifier means to an X-ray projection point of said subject part corresponding to said marker and being irradiated by X-ray of said second X-ray source, l=the width of said image intensifier means, and Y=the depth of said intensifier means; and distance calculator means connected to said coordinate calculation means and calculating the distance between said markers from said coordinates.

2. A stereoscopic television apparatus as claimed in claim 1, in which said X-ray generating means includes an X-ray tube having two focal points which are separated with a distance between them and alternately radiate X-rays.

3. A stereoscopic television apparatus as claimed in claim 1, in which said image pickup means comprises first and second image sensors that alternately pick up X-ray images from said image intensifier means in synchronism with x-ray irradiation from said first and second X-ray sources.

4. A stereoscopic television apparatus, comprising:

image signal output means for generating image signals corresponding to views of right and left eyes;

display means which displays as images said image signals being output from said image signal output means and corresponding to the respective views of the right and left eyes;

optical means employed to create as a stereoscopic image said images displayed by said display means;

marker signal output means connected to the output of said image signal output means and generating marker signals for combining with said image signals to form at least two markers in the stereoscopic image being displayed by said display means and observed through said optical means, in which said marker signal output means includes means for generating marker signals, in a manner of representing stereoscopically, the marker nearer to the observer in a larger size than the size of the marker farther away from the observer;

coordinate calculation means connected to said marker signal output means and calculating coordinates of markers from said marker signals; and distance calculator means connected to said coordinate calculation means and calculating the distance between said markers from said coordinates.

5. A stereoscopic television apparatus, comprising:

image signal output means for generating image signals corresponding to views of right and left eyes, in which said image signal output means includes image pickup means which picks up image of a subject from first and second image pickup positions corresponding to right and left eyes;

display means which displays as images said image signals being output from said image signal output means and corresponding to the respective views of the right and left eyes;

optical means employed to create as a stereoscopic image said images displayed by said display means;

marker signal output means connected to the output of said image signal output means and generating marker signals for combining with said image signals to form at least two markers in the stereoscopic image being displayed by said display means and observed through said optical means;

coordinate calculation means connected to said marker signal output means and calculating coordinates of markers from said marker signals, wherein said coordinate calculation means calculates coordinates (X, Y, Z) of said markers by the following formulas, $$\phi = (\pi - \theta)/2$$

$$\tan\xi = l/2\tan\phi/(XL - l/2)$$

$$\tan\eta = l/2\tan\phi/(XR - l/2)$$

$$X = c(XL + XR - l)/2(XL - l/2)$$

$$Y = cl(k - 2y)/l\tan\phi \cdot \tan\theta/2/2k(XL - XR)$$

$$Z = cl\tan\phi/2(XL - XR)$$

where $\theta$=the angle of view of camera, $\eta$, $\xi$=the angle of subject to first and second image pickup positions, l=the length of horizontal axis of frame, XL and XR=the distance from the left end of frame to the object corresponding to the marker; and distance calculator means connected to said coordinate calculation means and calculating the distance between said markers from said coordinates.

6. A stereoscopic television apparatus as claimed in claim 5, in which said image pickup means comprises first and second solid image pickup cameras arranged to correspond to first and second image pickup positions.

7. A stereoscopic television apparatus, comprising:

image signal output means for generating image signals corresponding to views of right and left eyes, in which said image signal output means includes image pickup means for picking up image of a subject from first and second image pickup positions corresponding to right and left eyes;

display means which displays as images said image signals being output from said image signal output means and corresponding to the respective views of the right and left eyes;

optical means employed to create as a stereoscopic image said images displayed by said display means;

marker signal output means connected to the output of said image signal output means and generating marker signals for combining with said image signals to form at least two markers in the stereoscopic image being displayed by said display means and observed through said optical means;

coordinate calculation means connected to said marker signal output means and calculating coordinates of markers from said marker signals, wherein said coordinate calculation means includes means for setting, at least, an angle of view of camera, an angle of subject to first and second image pickup positions, and a distance between the first and second image pickup positions, to obtain angle data and distance data, and means for calculating the coordinates of said markers, based on the angle data and distance data; and distance calculator means connected to said coordinate calculation means and calculating the distance between said markers from said coordinates.

* * * * *

UNITED STATES PATENT AND TRADEMARK OFFICE
CERTIFICATE OF CORRECTION

PATENT NO. : 4,851,901
DATED : July 25, 1989
INVENTOR(S) : Kenji Iwasaki It is certified that error appears in the above-identified patent and that said Letters Patent is hereby corrected as shown below:

Claim 1, column 9, line 9, change "1" to --$\ell$--

Claim 1, column 9, line 10, change "Y" to --y--.

Claim 3, column 9, line 24, change "x" to --X--.

Claim 5, column 10, line 24, change "1" to --l--.

Signed and Sealed this

Third Day of November, 1992

Attest:

DOUGLAS B. COMER

Attesting Officer     Acting Commissioner of Patents and Trademarks